United States Patent
Boday et al.

(10) Patent No.: US 9,493,696 B1
(45) Date of Patent: Nov. 15, 2016

(54) MULTIPHASE RESINS WITH REDUCED PERCOLATION THRESHOLD

(71) Applicant: International Business Machines Corporation, Armonk, NY (US)

(72) Inventors: Dylan J. Boday, Austin, TX (US); Jeannette M. Garcia, San Leandro, CA (US); James L. Hedrick, Pleasanton, CA (US); Rudy J. Wojtecki, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/951,252

(22) Filed: Nov. 24, 2015

(51) Int. Cl.
 C09K 5/14 (2006.01)
 C08L 83/04 (2006.01)
 C08L 25/06 (2006.01)

(52) U.S. Cl.
 CPC .................. *C09K 5/14* (2013.01); *C08L 25/06* (2013.01); *C08L 83/04* (2013.01)

(58) Field of Classification Search
 CPC .......... C09K 5/14; C08L 83/04; C08L 25/06
 See application file for complete search history.

(56) References Cited

U.S. PATENT DOCUMENTS

| 6,203,727 | B1 | 3/2001 | Babinec et al. |
| 6,417,265 | B1 | 7/2002 | Foulger |
| 7,026,403 | B2 | 4/2006 | Dharmarajan et al. |
| 7,479,516 | B2 | 1/2009 | Chen et al. |
| 7,902,275 | B2 | 3/2011 | Gerhardt et al. |
| 8,563,213 | B2 | 10/2013 | Bowles et al. |
| 8,653,177 | B2 | 2/2014 | Nagao et al. |
| 2005/0029498 | A1 | 2/2005 | Elkovitch et al. |
| 2009/0039018 | A1 | 2/2009 | Jordi et al. |
| 2011/0152435 | A1* | 6/2011 | Morishita .............. B82Y 30/00 524/504 |
| 2014/0120399 | A1 | 5/2014 | Balandin |
| 2014/0306164 | A1 | 10/2014 | Restuccia et al. |
| 2016/0042831 | A1* | 2/2016 | Kotani .................... C08L 63/00 252/75 |

* cited by examiner

*Primary Examiner* — Robert Harlan
(74) *Attorney, Agent, or Firm* — Patterson + Sheridan, LLP

(57) ABSTRACT

In some embodiments, a resin has a first domain having a first polymer. The resin has a second domain within the first domain having a second polymer and coupled to the first domain at a plurality of interfaces. The resin also has a thermally conductive filler material distributed along the plurality of interfaces. The thermally conductive filler material is present at a concentration between about 0.1 vol % and about 15 vol % of the resin.

18 Claims, 1 Drawing Sheet

MULTIPHASE RESINS WITH REDUCED PERCOLATION THRESHOLD

FIELD

The present disclosure relates to multiphasic composite films having fillers at the interface(s) of the multiphases.

BACKGROUND

As microelectronic devices continue to miniaturize, the thermal conductivity of both electronic packaging and semiconductor chips is becoming critical as the ability to dissipate the heat generated limits performance and reliability. Most polymers are thermal insulators, but can be used as thermal conductors once an appropriate filler is added. Typically, high filler loading levels are required to show significant improvements in conductivity, especially for spherical particles. In general, percolation threshold is defined as the concentration at which the particles become connected, forming a network, to attain the maximum conductivity. This concentration is dependent on filler size, shape, the alignment strategy, supramolecular interactions and interfaces. Unfortunately, these high loading levels, typically in the range of 50 to 66 wt %, adversely affect dielectric constant and mechanical properties of the host material. To this end, strategies designed to reduce the percolation threshold would provide a game-changing strategy that would benefit many technologies.

Broadly applicable methods and materials of reducing percolation threshold within polymer materials are needed.

SUMMARY

In some embodiments, a resin has a first domain having a first polymer and a second domain having a second polymer and within the first domain and coupled to the first domain at a plurality of interfaces. The resin has a thermally conductive filler material distributed along the plurality of interfaces. The thermally conductive filler material is present at a concentration between about 0.1 vol % and about 15 vol % of the resin.

In some embodiments, a resin is the reaction product of: a diamine of the formula

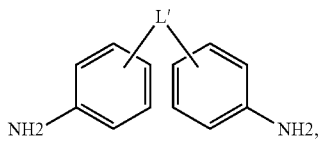

where L' is a divalent linker selected from the group consisting of *—P(=O)(CH$_3$)—*,

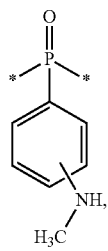

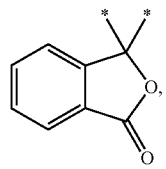 [SMILES: *C1(*)OC(=O)c2ccccc21]

*—O—*, *—S—*, *—N(R')—*, *—N(H)—*, and *—R"—*, and wherein R' is C1-C20 alkyl and R" is C1-C20 alkyl. The resin is also the reaction product of an aldehyde and/or an epoxide, a polymer, and a filler material.

In some embodiments, a resin has two or more polymers independently selected from acrylonitrile-butadiene copolymer, polysiloxane, polyester, poly(arylether), polyamide, perfluorinated fluoropolymer, a polymer having a plurality of hexahydrotriazine linkages, and a polymer having a plurality of amino alcohol moieties. The resin also has a filler material between about 1 vol % and about 15 vol % of the resin and located substantially at an interface of the first polymer and second polymer.

DETAILED DESCRIPTION

Figure 1:
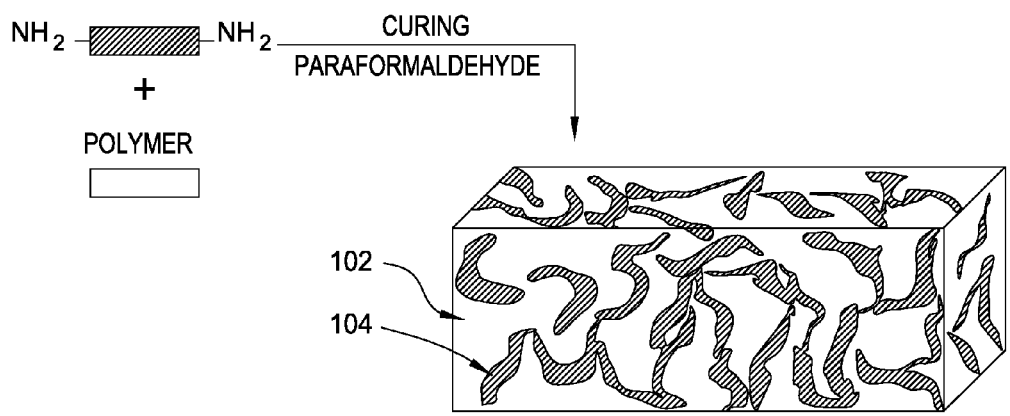
FIG. 1 is a process scheme illustrating a chemical reaction system.

Compounds, resins (compositions), and methods described herein may take advantage of macrophase segregation of polymers having varying chemical structures into domains. The Flory-Huggins interaction parameter ($\chi$) gives a measure of the interaction of polymer chains with solvent molecules as well as polymer-polymer interactions. Utilizing the Flory-Huggins interaction parameter ($\chi$), volume percentages of a first polymer and a second polymer can be utilized such that phase segregation into domains is achieved. A lower volume fraction of a first polymer as compared to the volume fraction of a second polymer promotes an irregular phase (microdomain) comprising the first polymer and a bulk phase comprising the second polymer upon curing. Furthermore, a filler material may be added to the material before curing, and the phase segregation upon curing promotes filler material toward the interfaces of domains throughout the sample. Compounds, resins (compositions), and methods described herein allow for improved mechanical properties, glass transition temperatures, and thermal conductivity (percolation threshold) of resin material.

In some embodiments, a resin has a first domain having a first polymer and a second domain having a second polymer and the second domain is within the first domain. The second domain is coupled to the first domain at a plurality of interfaces. The first polymer may have a hexahydrotriazine linkage. The first polymer may have an amino alcohol moiety. The first polymer may be selected from acrylonitrile-butadiene copolymer, polysiloxane, polyester, poly(arylether), polyamide, perfluorinated fluoropolymer, and mixtures thereof, and the first polymer may have an —NH$_2$ moiety at each terminus. In some embodiments, the first domain has a first polymer that is between about 60 vol % and about 70 vol % of the resin.

The second domain may have a second polymer having a hexahydrotriazine linkage. The second domain may have a second polymer having an amino alcohol moiety. The first polymer or second polymer may have a plurality of hexahydrotriazine linkages, and each hexahydrotriazine linkage is bonded to a divalent bridging group of the formula:

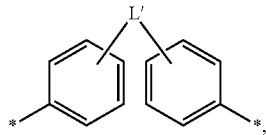

where L' is a divalent linker selected from the group consisting of *—P(=O)(CH$_3$)—*,

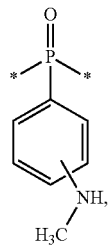

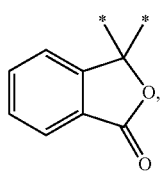

*—O—*, *—S—*, *—N(R')—*, *—N(H)—*, and *—R"—*, each starred bond of a given divalent linker is covalently linked to a respective one of the phenyl rings of the divalent bridging group, and each starred bond of a given bridging group is linked to a respective one of the hexahydrotriazine groups. R' includes C1-C20 alkyl and R" includes C1-C20 alkyl. The first polymer or second polymer may have a polyester backbone or aryl backbone. In some embodiments, the first polymer or second polymer is acrylonitrile-butadiene copolymer, polysiloxane, polyester, poly(arylether), polyamide, perfluorinated fluoropolymer, or mixtures thereof, and the polymer may have an —NH$_2$ moiety at each terminus. The second domain may be a plurality of microdomains.

The resin has a thermally conductive filler material between about 0.1 vol % and about 15 vol %, for example between about 8 vol % and about 12 vol %, of the resin and located substantially at the interface of the first domain and the second domain. In some embodiments, the filler is selected from graphite, carbon fiber, single-walled carbon nanotube, multi-walled carbon nanotube, graphine, metal, ceramic, and mixtures thereof. A surface of the thermally conductive filler may be partially functionalized or fully functionalized with fluoro, hydroxyl, alkyl, or mixtures thereof.

In some embodiments, a resin is the reaction product of:
a diamine of the formula

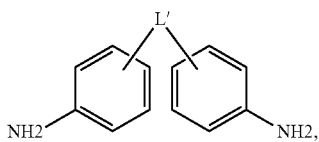

where L' is a divalent linker selected from the group consisting of *—P(=O)(CH$_3$)—*,

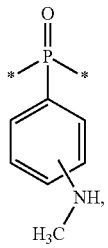

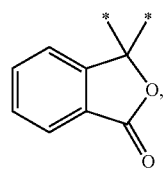

*—O—*, *—S—*, *—N(R')—*, *—N(H)—*, and *—R"—*, each starred bond of a given divalent linker group is covalently linked to a respective one of the phenyl rings of the diamine. R' is C1-C20 alkyl and R" is C1-C20 alkyl. The resin is also the reaction product of an aldehyde and/or an epoxide, a polymer, and a filler material. The polymer may be selected from the group consisting of acrylonitrile-butadiene copolymer, polysiloxane, polyester, poly(arylether), polyamide, perfluorinated fluoropolymer, and mixtures thereof.

In some embodiments, a resin has two or more polymers independently selected from the group consisting of acrylonitrile-butadiene copolymer, polysiloxane, polyester, poly(arylether), polyamide, perfluorinated fluoropolymer, a polymer having a plurality of hexahydrotriazine linkages, and a polymer having a plurality of amino alcohol moieties. A polymer of the two or more polymers may be between about 60 vol % and about 70 vol % of the resin. At least two of the two or more polymers may be copolymerized with each other. The resin has a filler material between about 0.1 vol % and about 15 vol % of the resin and located substantially at an interface of the first polymer and second polymer. In some embodiments, the filler is selected from graphite, carbon fiber, single-walled carbon nanotube, multi-walled carbon nanotube, graphine, metal, ceramic, and mixtures thereof. A surface of the filler may be partially functionalized or fully functionalized with fluoro, hydroxyl, alkyl, or mixtures thereof. As described herein, "partially functionalized" means not all suitable reactive moieties of a thermally conductive filler have been reacted/treated with a reagent to form fluoro, hydroxyl, or alkyl moieties along the surface of a filler. As described herein, "fully functionalized" means substantially all suitable reactive moieties of a thermally conductive filler have been reacted/treated with a reagent to form fluoro, hydroxyl, or alkyl moieties along the surface of the filler.

In some embodiments, a resin, such as a thermoset, contains one or more first polymers, such as a thermosetting material. First polymers include polyhexahydrotriazines (PHTs). PHTs are an emerging class of high strength engineering thermosetting polymers that have a unique combination of properties. PHTs have high modulus, solvent resistance, and resistance to environmental stress cracking A hexahydrotriazine is a molecule, oligomer, or polymer that has a plurality of trivalent hexahydrotriazine linkages of the structure:

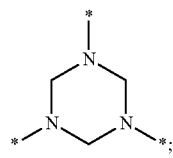

and a plurality of divalent bridging groups of formula (1):

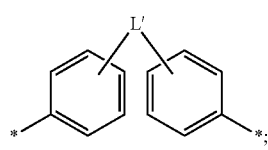

(1)

wherein L' is a divalent linker selected from the group consisting of *—P(=O)(CH$_3$)—*,

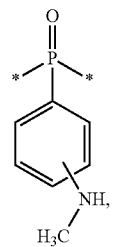

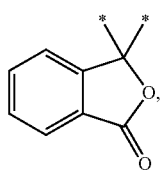

*—O—*, *—S—*, *—N(R')—*, *—N(H)—*, and *—R"—*, wherein R' is C1-C20 alkyl and R" is C1-C20 alkyl, each starred bond of a given hexahydrotriazine group is covalently linked to a respective one of the divalent bridging groups, and each starred bond of a given bridging group is linked to a respective one of the hexahydrotriazine groups. In one embodiment, R' and R" are independently selected from a C1-C20 alkyl selected from the group consisting of *-methyl-*, *-ethyl-*, *-propyl-*, *-isopropyl-*, *-phenyl-*, and fluorenyl:

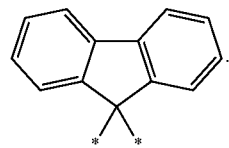 [SMILES: *C1(*)c2ccccc2-c2ccccc21]

For PHT materials with bridging groups of formula (1), the PHT may be represented by formula (2):

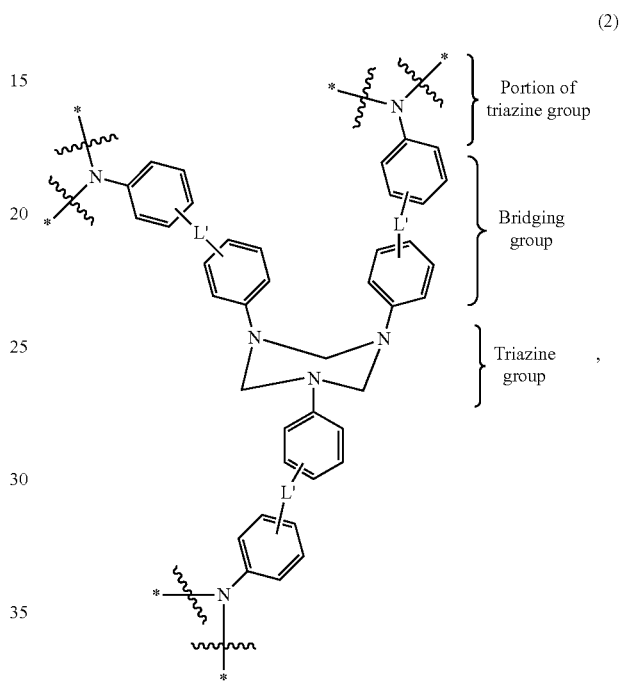

(2)

wherein L' is a divalent linker selected from the group consisting of *—P(=O)(CH$_3$)—*,

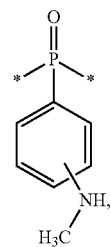

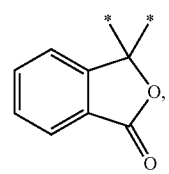

*—O—*, *—S—*, *—N(R')—*, *—N(H)—*, *—R"—*, and combinations thereof, wherein R' is C1-C20 alkyl and R" is C1-C20 alkyl, each starred bond of a given hexahydrotriazine group is covalently linked to a respective one of the divalent bridging groups, and each starred bond of a given bridging group is linked to a respective one of the hexahydrotriazine groups. In one embodiment, R' and R" are independently selected from a C1-C20 alkyl selected from the group consisting of *-methyl-*, *-ethyl-*, *-propyl-*, *-isopropyl-*, *-phenyl-*, and fluorenyl:

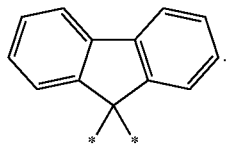 [SMILES: *C1(*)c2ccccc2-c2ccccc21]

Each nitrogen having two starred wavy bonds in formula (2) is a portion of a different hexahydrotriazine group.

A suitable PHT material may be made by forming a reaction mixture comprising i) one or more monomers comprising two aromatic primary amine groups, and ii) paraformaldehyde, and heating (curing) the first mixture at a temperature of about 50° C. to about 300° C., preferably about 165° C. to about 225° C., thereby forming a product comprising a polyhexahydrotriazine. The heating time at any of the above temperatures can be for about 1 minute to about 24 hours. Diamine monomers suitable for making such PHT materials may have the general structure $H_2N$—Ar-L'-Ar—$NH_2$, where Ar denotes a benzene ring group and L' is defined as described for Formula (1).

A different carbonyl containing compound (i.e., not paraformaldehyde) may be used in addition to or as a replacement of paraformaldehyde. Carbonyl containing compounds include aldehydes and ketones. As described herein, the term "aldehyde" includes aldehyde monomers and polyethers, such as paraformaldehyde, that can decompose thermally into aldehyde monomers. Paraformaldehyde may be added to a reaction mixture, where it can decompose in situ into formaldehyde monomers (which have carbonyl moieties). Decomposition of paraformaldehyde may be promoted by heating (e.g., curing) the reaction mixture. Aldehydes include formaldehyde, acetaldehyde, and polymerized aldehydes such as paraformaldehyde. A ketone, such as acetone, may be used instead of or in addition to an aldehyde.

Non-limiting exemplary aromatic diamine monomers include the following structures:

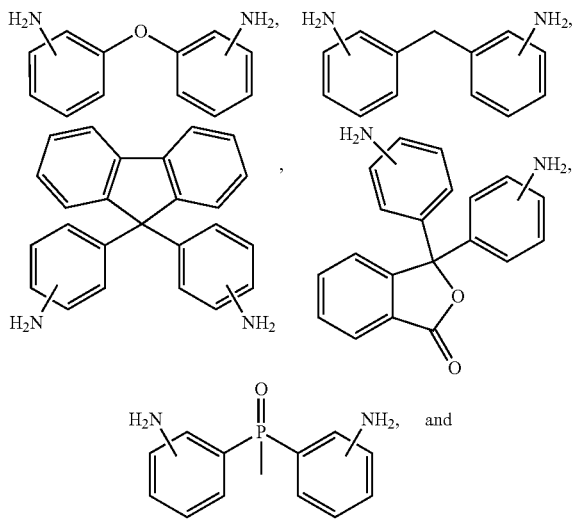

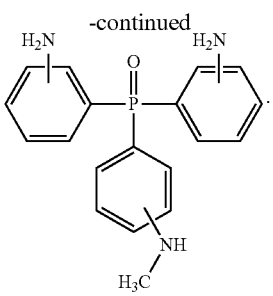

First polymers also include epoxies and reaction products thereof. Reaction products of epoxies include reactions of the epoxy moieties with diamines as described above to form polymers having amino alcohol moieties. Epoxies include polyesters with epoxy moieties at the termini. Polyester-based epoxies may be of the formula:

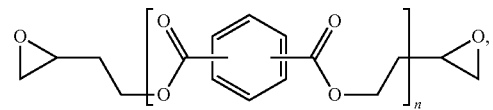

where n is a positive integer, such as an integer between about 1 and about 200, such as about 5 and about 100, such as about 20 and about 50.

Epoxies also include various other epoxies having aryl moieties along the polymer backbone. Aryl-based epoxies may be of the formula:

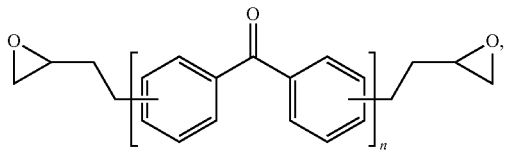

where n is a positive integer, such as an integer between about 1 and about 200, such as about 5 and about 100, such as about 20 and about 50.

Other epoxies include diglycidyl ether of a bisphenol, such as bisphenol A, N,N,N',N'-tetraglycidyl diamino diphenylmethane (e.g. grades MY 9663, MY 720 or MY 721; Huntsman); N,N,N',N'-tetraglycidyl-bis(4-aminophenyl)-1,4-diisopropylbenzene (e.g. EPON 1071; Momentive); N,N,N',N'-tetraclycidyl-bis(4-amino-3,5-dimethylphenyl)-1,4-diisopropylbenzene, (e.g. EPON 1072; Momentive); triglycidyl ethers of p-aminophenol (e.g. MY 0510; Hunstman); triglycidyl ethers of m-aminophenol (e.g. MY 0610; Hunstman); diglycidyl ethers of bisphenol A based materials such as 2,2-bis(4,4'-dihydroxy phenyl)propane (e.g. DER 661 (Dow), or EPON 828 (Momentive) and Novolac resins preferably of viscosity 8-20 Pa s at 25° C.; glycidyl ethers of phenol Novolac resins (e.g. DEN 431 or DEN 438; Dow); di-cyclopentadiene-based phenolic Novolac (e.g. Tactix 556, Huntsman); diglycidyl 1,2-phthalate (e.g. GLY CEL A-100); diglycidyl derivative of dihydroxy diphenyl methane (Bisphenol F) (e.g. PY 306; Huntsman). Other epoxies include cycloaliphatics such as 3',4'-epoxycyclohexyl-3,4-epoxycyclohexane carboxylate (e.g. CY 179; Huntsman).

In some embodiments, one or more epoxies are mixed with a diamine and paraformaldehyde to form crosslinked networks that phase segregate. For example, one —$NH_2$ moiety of a diamine or polymer containing —$NH_2$ reacts with paraformaldehyde to form an imine. The imine then reacts with two other imine compounds in the reaction mixture to form a hexahydrotriazine crosslink (as described above). Another —$NH_2$ moiety of the diamine or polymer containing —$NH_2$ reacts with an epoxy moiety of the epoxy compound to form an amino alcohol moiety of an adduct or copolymer, i.e. the adduct or copolymer has a hexahydrotriazine crosslink at a first terminus and an amino alcohol moiety at a second terminus. Alternatively, both —$NH_2$ moieties of a diamine or polymer containing —$NH_2$ moieties react with epoxy moieties of epoxy compounds to form an adduct or polymer having an amino alcohol moiety at each terminus. Alternatively, both —$NH_2$ moieties of a diamine or polymer containing —$NH_2$ moieties may react with paraformaldehyde to form a polymer having a hexahydrotriazine crosslink at each terminus. As described herein, a terminus refers to opposing ends of a molecule or polymer. Again, phase segregation into microdomains and a bulk phase may be promoted depending on the volume fractions of epoxies and diamines. In general, copolymerizations promote phase segregation.

First polymers also include acrylates and anhydrides. Acrylate includes diacrylates and triacrylates, such as 1,4-butanediol diacrylate and trimethylolpropane triacrylate, respectively. In some embodiments, an anhydride may react with a diamine in a reaction mixture to form a maleimide. For example, ethylene glycol bis(trimellitic anhydride) and 4,4'-(1,4-phenylenediisopropylidene)bisaniline are added to a reaction mixture to form a product having maleimide moieties. The maleimide moieties can self-polymerize and/or react with a diamine (a conjugate addition) to form a first polymer. The anhdydride can also self-polymerize to form a self-polymerized first polymer.

In some embodiments, a resin further contains one or more second polymers, such as a thermoplastic or elastomeric material. The second polymer may have a low glass transition temperature (Tg), which creates a "rubber toughened" network. Low Tg polymers include acrylonitrile-butadiene copolymers, polysiloxanes, and polyesters. Alternatively, the second polymer may have a high Tg to improve or maintain modulus of the product. High Tg polymers include poly(arylethers), polyesters and polyamides. In some embodiments, second polymers include fluoropolymers such as perfluoropolyethylene and perfluoropolypropylene. Second polymers may contain reactive moieties, such as —$NH_2$, at, for example, the polymer termini. Second polymers containing reactive moieties at the termini promotes copolymerization with first polymer adducts/polymers, as well as cross-linking of a second polymer via hexahydrotriazine linkages and/or amino alcohol crosslinks.

In embodiments where a resin contains one or more second polymers, phase segregation between the first polymer and second polymer is generated via a nucleation by polymer growth process (Flory-Huggins interaction parameter ($\chi$)). In such embodiments, macrophase separation is preferable and creates contiguous interfaces of the first and second polymers. FIG. 1 is a process scheme 100 illustrating a chemical reaction system.

As shown in FIG. 1, diamine is mixed with a second polymer followed by addition of paraformaldehyde to form a reaction mixture. The reaction mixture is then cured to form a reaction product (resin) having (1) a bulk phase 102 comprising substantially the second polymer and (2) an irregular phase 104 comprising substantially a first polymer, such as a polymer containing hexahydrotriazine linkages. Curing temperatures may be between about 50° C. and about 250° C., such as about 150° C. and about 225° C., for example 200° C. In some embodiments, an irregular phase (microdomain) has a diameter in the micrometer (micron) range. In some embodiments, block copolymers are present/formed, where an irregular phase may have a diameter greater than the micron range. The diamine monomer and formaldehyde may be miscible with the second polymer, such that a solvent may be absent from the reaction mixture. Suitable diamine monomers may have the general structure $H_2N$—Ar-L'-Ar—$NH_2$, where Ar denotes a benzene ring and L' is defined as described above. As polymerization of the diamine and paraformaldehyde occur (and the first polymer increases in molecular weight), phase separation occurs between the first polymer and the second polymer and the first polymer phase increases in viscosity (vitrificates). Phase separation is quenched upon partial or substantial vitrification, locking in the morphology of the multiphasic (e.g., biphasic) system. The extent of the phase separation may be controlled by the molecular weight of the first polymer and the second polymer. Without being bound by theory, a larger molecular weight of a polymer yields a larger domain than a polymer having a smaller molecular weight. In general, larger molecular weight polymers create a more distinct interface than smaller molecular weight polymers, and distinct interfaces may be preferred. In some embodiments, polymers described herein have between about 2 and about 200 monomeric units (n=about 2 to about 500), such as about 10 and about 200, such as about 50 and about 150. Additionally, solubility mismatch between the first polymer and the second polymer may also affect the extent of phase separation. Without being bound by theory, a lower solubility mismatch (i.e., two types of polymers are more soluble with one another) leads to mixing of polymer domains at low molecular weights. As molecular weights increase, if mismatch is constant, phase segregation will occur. Furthermore, the extent of phase separation may be controlled by the reactive end-groups of the first polymer and second polymer. For example, the second polymer may have reactive end groups, such as —$NH_2$ moieties at each terminus that can react with an aldehyde and/or epoxy present in the mixture in order to form a polymer with hexahydrotriazine crosslinks or amino alcohol linkages, respectively. A second polymer having reactive end groups may form a block copolymer with the first polymer.

Although Scheme 1 shows the first polymer as the irregular phase and the second polymer as the bulk phase, the first polymer may be the bulk phase and the second polymer may be the irregular phase in other embodiments. Which polymer (i.e., the first polymer or second polymer) is the bulk phase or the irregular phase may be controlled by the volumetric ratio of starting material (e.g., diamine+aldehyde) relative to second polymer. An excess volume of second polymer relative to starting material (e.g., diamine+aldehyde) promotes the first polymer as the irregular phase (microdomain). In some embodiments, a first polymer or second polymer makes up between about 60 vol % and about 99 vol % of the overall material, such as between about 60 vol % and about 70 vol %. In some embodiments, a resin contains exclusively two or more different first polymers without any second polymers, such as one first polymer having a plurality of hexahydrotriazine linkages and another first polymer having a plurality of amino alcohol linkages. In such embodiments, a multiphasic resin containing two or more different first polymers may be formed. In some embodiments, a resin contains exclusively two or more second polymers without any first polymers. In such embodiments, a multiphasic resin containing two or more second polymers is formed.

In some embodiments, a resin further contains a filler material. Filler material includes graphite, carbon fibers, single-walled carbon nanotubes (SWNTs), multi-walled carbon nanotubes (MWNTs), graphine, metals and ceramics. Metals include compounds containing iron, copper, silver, gold, and niobium. Fillers may be rod-shaped, sphere-shaped, or plate-shaped. The filler may have properties, such as polarity, such that the filler segregates substantially to an interface of the first polymer and second polymer, as shown in FIG. 2.

Figure 2:
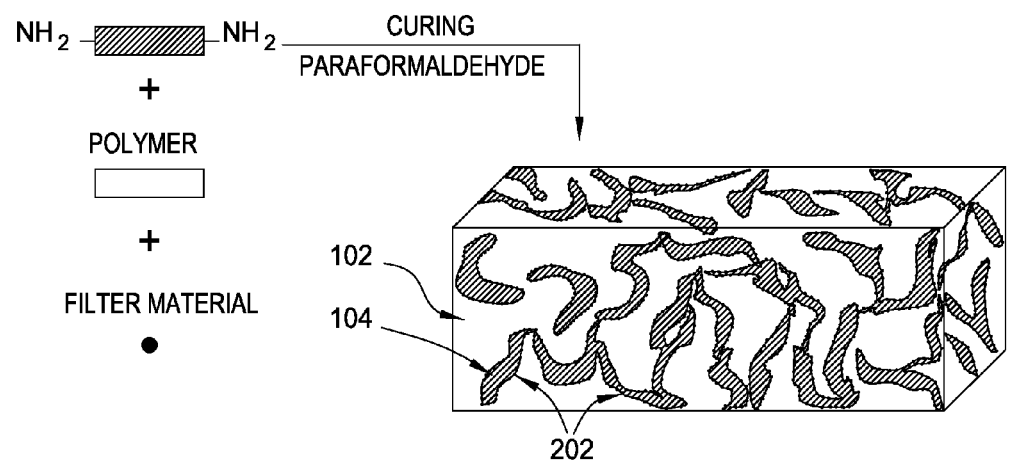
FIG. 2 is a process scheme illustrating another chemical reaction system.

FIG. 2 is a process scheme 200 illustrating a chemical reaction system. FIG. 2 is the same as FIG. 1, except filler material 202 is shown at the interfaces of the bulk phase 102 and the irregular phase 104. As described herein, a filler material present "substantially at an interface" is defined as between about 90% and about 100% of a filler material present in a resin is present at an interface between domains. Filler material is incorporated into a resin by mixing starting materials to form a first polymer, along with, for example, a second polymer, and mixing in filler, followed by casting the resin onto a substrate and curing. Casting includes placing the mixture in a Teflon dish, spin-coating, or other suitable molds.

The filler material may be surface treated to form a surface-treated filler material. A filler material and/or surface-treated filler material may be repulsed by the first polymer and/or the second polymer (and forced toward the interface(s) of the bulk phase and irregular phase). However, if the repulsive forces are too great by the first polymer and the second polymer, particles of filler material may be prone to aggregate with other particles of filler material. Alternatively, if a filler material is not repulsed enough by the first polymer and the second polymer, filler material may be prone to distribute substantially uniformly through the bulk phase and/or irregular phase. Therefore, embodiments herein describe filler material having a surface with polarity such that filler material particles are repulsed substantially to a bulk phase/irregular phase interface instead of self-aggregation and instead of uniform distribution through the bulk phase and/or irregular phase. For example, a first polymer or second polymer may be a fluoropolymer and a filler material may have a substantially fluorinated surface. In another example, a first polymer or second polymer is each very polar and a filler material may have a substantially hydroxylated surface. In some embodiments, the polarity of a surface of a filler is less incompatible with the polymer of the irregular phase than the polymer of the bulk phase. Surface treatment may be carried out by altering the polarity of the surface of the filler particle. Polarity of a filler material may be reduced by alkylation of the filler surface. For example, a filler surface may be treated with an alkyl halide to form an alkylated filler surface.

Surface treatment yields noncovalent functionalization and/or covalent functionalization of the filler material. Both the techniques lead to hydrophilic/hydrophobic moieties either physically adsorbed or chemically grafted with the surface of the filler material. For example, in some embodiments, washing a filler material with a hydrophilic electrophile, such as an epoxide, yields a hydroxyl substituted filler material. A hydroxyl substituted filler material will be repulsed by a hydrophobic second polymer (such as an acrylonitrile-butadiene copolymer) while interacting more preferentially toward a polar first polymer (such as a PHT), such that the filler material is present substantially at the interface(s) between the domains of the first polymer and the second polymer. Although Scheme 1 shows the first polymer as the irregular phase and the second polymer as the bulk phase, the first polymer may be the bulk phase and the second polymer may be the irregular phase in other embodiments. Which polymer (i.e., the first polymer or second polymer) is the bulk phase or the irregular phase may be controlled by the volumetric ratio of starting material (e.g., diamine+aldehyde) relative to second polymer. An excess volume of second polymer relative to starting material (e.g., diamine+aldehyde) promotes the first polymer as the irregular phase. In some embodiments, a filler material is slightly dispersed within the irregular phase and/or the bulk phase.

Filler segregation allows percolation and hence thermal conductivity at low volume fractions. In some embodiments, filler material comprises between about 0.1 vol % and about 15 vol % of the resin, such as about 1 vol % and about 10 vol %. Thermal conductivity and resistance are adequate even if the filler material is present substantially at interfaces between the first polymer and the second polymer domains. In such embodiments, a particle of filler material is in mechanical contact with another particle of filler material in the resin. Furthermore, because the filler material is distributed along the interface(s) between the first polymer and the second polymer, the percolation threshold is substantially reduced as compared to conventional thermal conductors.

In addition or alternatively to filler material, cellulose material may be added to a mixture to promote further improved mechanical properties of a resin. Reaction mixtures described herein may further comprise a solvent, such as an organic solvent. The organic solvent may be polar. Polar aprotic solvents usable for the methods and resins described herein include N-methyl-pyrrolidone (NMP), dimethylsulfoxide (DMSO), N,N-dimethylformamide (DMF), N,N-dimethylacetamide (DMA), propylene carbonate (PC), propylene glycol methyl ether acetate (PGMEA), and mixtures thereof.

EXAMPLE 1

Siloxane+Polystyrene: These Polymers are Very Structurally Dissimilar and Incompatible Overall, compounds, resins (compositions), and methods described herein take advantage of macrophase segregation of polymers having varying chemical structures into multiphasic domains. A lower volume fraction of a first polymer as compared to the volume fraction of a second polymer promotes an irregular phase (microdomain) comprising the first polymer and a bulk phase comprising the second polymer upon curing. Furthermore, a filler material may be added to the material before curing, and the phase segregation upon curing promotes filler material toward the interfaces of domains throughout the sample. Compounds, resins (compositions), and methods described herein allow for improved mechanical properties, glass transition temperatures, and thermal conductivity (percolation threshold) of resin material. As polymerization of starting materials into a polymer occurs (and the polymer increases in molecular weight), phase separation occurs between the first polymer and the second polymer and the first polymer phase increases in viscosity (vitrificates). Phase separation is quenched upon partial or substantial vitrification, locking in the morphology of the multiphasic (e.g., biphasic) system. The extent of the phase separation may be controlled by the molecular weight of the first polymer and the second polymer, solubility mismatch between the first polymer and the second polymer, and the reactive end-groups of the first polymer and second polymer. Filler material described herein has a surface with polarity such that filler material particles are repulsed substantially to a bulk phase/irregular phase interface instead of self-aggregation and instead of uniform distribution through the bulk phase and/or irregular phase. Filler segregation allows percolation and hence thermal conductivity at low volume fractions. In some embodiments, filler material comprises between about 0.1 vol % and about 15 vol % of the resin, such as about 1 vol % and about 10 vol %. Thermal conductivity and resistance are adequate even if the filler material is present substantially at interfaces between the domains. In such embodiments, a particle of filler material is in mechanical contact with another particle of filler material in the resin. Because the filler material is present substantially at interface(s) between the first polymer and the second polymer, the percolation threshold is substantially reduced as compared to conventional thermal conductors.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing is directed to embodiments of the present invention, other and further embodiments of the invention may be devised without departing from the basic scope thereof, and the scope thereof is determined by the claims that follow.

What is claimed is:

1. A resin comprising:
a first domain having a first polymer;
a second domain within the first domain having a second polymer and coupled to the first domain at a plurality of interfaces, wherein the first polymer or the second polymer has a hexahydrotriazine linkage; and
a thermally conductive filler material distributed along the plurality of interfaces, wherein the thermally conductive filler material is present at a concentration between about 0.1 vol % and about 15 vol % of the resin.

2. A resin comprising:
a first domain having a first polymer;
a second domain within the first domain having a second polymer and coupled to the first domain at a plurality of interfaces; wherein the first polymer or the second polymer has an amino alcohol moiety; and
a thermally conductive filler material distributed along the plurality of interfaces, wherein the thermally conductive filler material is present at a concentration between about 0.1 vol % and about 15 vol % of the resin.

3. The resin of claim 1, wherein the first polymer has a plurality of hexahydrotriazine linkages, and each hexahydrotriazine linkage is bonded to a divalent bridging group of the formula:

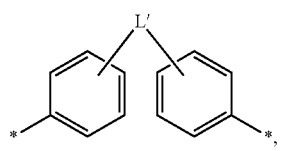

wherein L' is a divalent linker selected from the group consisting of *—P(=O)(CH$_3$)—*,

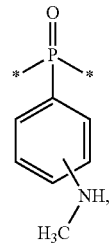

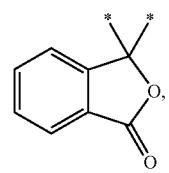

*—O—*, *—S—*, *—N(R')—*, *—N(H)—*, and *—R"—*, wherein R' is C1-C20 alkyl and R" is C1-C20 alkyl.

4. The resin of claim 2, wherein the first polymer further comprises a polyester backbone or aryl backbone.

5. The resin of claim 1, wherein the first polymer is selected from the group consisting of acrylonitrile-butadiene copolymer, polysiloxane, polyester, poly(arylether), polyamide, perfluorinated fluoropolymer, and mixtures thereof.

6. A resin comprising:
a first domain having a first polymer; wherein the first polymer is selected from the group consisting of acrylonitrile-butadiene copolymer, polysiloxane, polyester, poly(arylether), polyamide, perfluorinated fluoropolymer, and mixtures thereof, wherein the first polymer has an —NH$_2$ moiety at each terminus;
a second domain within the first domain having a second polymer and coupled to the first domain at a plurality of interfaces; and
a thermally conductive filler material distributed along the plurality of interfaces, wherein the thermally conductive filler material is present at a concentration between about 0.1 vol % and about 15 vol % of the resin.

7. The resin of claim 3, wherein R" is a C1-C20 alkyl selected from the group consisting of *-methyl-*, *-ethyl-*, *-propyl-*, *-isopropyl-*, *-phenyl-*, and

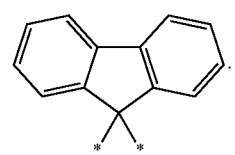 [SMILES: *C1(*)c2ccccc2-c2ccccc21]

8. The resin of claim 2, wherein the second polymer has an aminoalcohol moiety and the first polymer has a hexahydrotriazine linkage of the structure:

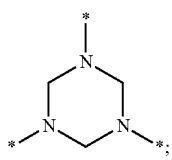

and
a plurality of divalent bridging groups of the structure:

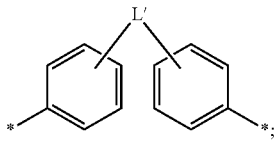

L' is selected from the group consisting of *—P(=O)(CH₃)—*,

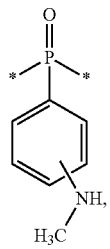

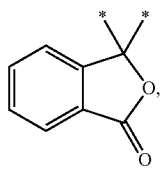

*—S—*, *—N(R')—*, *—N(H)—*, and *—R"—*;
R' is C1-C20 alkyl; and
R" is C1-C20 alkyl.

9. The resin of claim 8, wherein R" is a C1-C20 alkyl selected from the group consisting of *-methyl-*, *-ethyl-*, *-propyl-*, *-isopropyl-*, *-phenyl-*, and

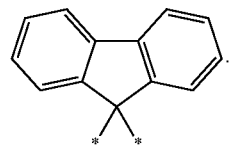 [SMILES: *C1(*)c2ccccc2-c2ccccc21]

10. The resin of claim 1, wherein the thermally conductive filler is selected from the group consisting of graphite, carbon fiber, single-walled carbon nanotube, multi-walled carbon nanotube, graphene, metal, ceramic, and mixtures thereof.

11. The resin of claim 2, wherein the thermally conductive filler is selected from the group consisting of graphite, carbon fiber, single-walled carbon nanotube, multi-walled carbon nanotube, graphene, metal, ceramic, and mixtures thereof.

12. The resin of claim 6, wherein the thermally conductive filler is selected from the group consisting of graphite, carbon fiber, single-walled carbon nanotube, multi-walled carbon nanotube, graphene, metal, ceramic, and mixtures thereof.

13. The resin of claim 1, wherein the first polymer is between about 60 vol % and about 70 vol % of the resin.

14. The resin of claim 2, wherein the first polymer is between about 60 vol % and about 70 vol % of the resin.

15. The resin of claim 6, wherein the first polymer is between about 60 vol % and about 70 vol % of the resin.

16. The resin of claim 1, wherein a surface of the thermally conductive filler is partially functionalized or fully functionalized with fluoro, hydroxyl, alkyl, or mixtures thereof.

17. The resin of claim 2, wherein a surface of the thermally conductive filler is partially functionalized or fully functionalized with fluoro, hydroxyl, alkyl, or mixtures thereof.

18. The resin of claim 6, wherein a surface of the thermally conductive filler is partially functionalized or fully functionalized with fluoro, hydroxyl, alkyl, or mixtures thereof.

* * * * *